United States Patent
Chen

(10) Patent No.: US 12,287,689 B2
(45) Date of Patent: Apr. 29, 2025

(54) OPERATION METHOD OF A POWER SUPPLY CIRCUIT

(71) Applicant: NOVATEK MICROELECTRONICS CORP., Hsinchu (TW)

(72) Inventor: Wei-Ling Chen, Zhubei (TW)

(73) Assignee: Novatek Microelectronics Corp., Hsinchu (TW)

(*) Notice: Subject to any disclaimer, the term of this patent is extended or adjusted under 35 U.S.C. 154(b) by 250 days.

(21) Appl. No.: 18/319,047

(22) Filed: May 17, 2023

(65) Prior Publication Data

US 2024/0385670 A1 Nov. 21, 2024

(51) Int. Cl.
*H02M 1/00* (2007.01)
*G06F 1/3203* (2019.01)

(52) U.S. Cl.
CPC ......... *G06F 1/3203* (2013.01); *H02M 1/0048* (2021.05)

(58) Field of Classification Search
CPC .............. H04B 2215/069; H02M 1/32; H02M 1/081–084; H02M 1/0006; H02M 3/156; H02M 3/158; H02M 3/1588; H02M 3/155; H02M 3/1582; H02M 3/157; H02M 3/1563; H02M 3/1584
See application file for complete search history.

(56) References Cited

U.S. PATENT DOCUMENTS

| | | |
|---|---|---|
| 10,014,778 B1 | 7/2018 | Wei |
| 11,290,006 B2 | 3/2022 | Ozanoglu et al. |
| 2015/0236588 A1 | 8/2015 | Branca |
| 2018/0337603 A1* | 11/2018 | Houston ............ H02M 3/1582 |

FOREIGN PATENT DOCUMENTS

| | | |
|---|---|---|
| CN | 114710020 A | 7/2022 |
| TW | 202347942 A | 12/2023 |

OTHER PUBLICATIONS

International Examination Report mailed in Foreign Patent Application No. 112126541 on Jan. 17, 2024.

* cited by examiner

*Primary Examiner* — Bryan R Perez
(74) *Attorney, Agent, or Firm* — Rosenberg, Klein & Lee

(57) ABSTRACT

An operation method of a power supply circuit which is provided with an input voltage to generate a positive output voltage and a negative output voltage is proposed. The power supply circuit includes five switches and is electrically connected with an inductor through a first inductor node and a second inductor node. The disclosed operation method includes determining the power supply circuit to operate in a mode, which includes three operation phases, a first, second and third phase. Energizing currents can be generated and provided both to enhance the positive output voltage and negative output voltage by employing the proposed operation method. Since there is no transition of the voltage level of the second inductor node during the second phase to third phase transition, it is believed that the present invention effectively achieves in suppressing redundant power switching loss and providing optimized output power efficiency.

15 Claims, 12 Drawing Sheets

OPERATION METHOD OF A POWER SUPPLY CIRCUIT

BACKGROUND OF THE INVENTION

Field of the Invention

The present invention is related to an operation method of a power supply circuit. More particularly, it is related to an operation method of a single inductor bipolar output (SIBO) power supply scheme, in which both a positive output voltage and a negative output voltage can be increased through the inductor energizing mode including three operation phases.

Description of the Prior Art

As known, power is the backbone of any electronic system, and the power supply is what feeds the system. Choosing the right supply can be the critical difference between a device working at optimum levels and one that may deliver inconsistent results.

In addition to alternating current (AC) to direct current (DC) power supplies, DC to DC converters are also available. When DC is already available in the power supply system, then a DC to DC converter may be the better design choice as compared to the AC designed figure. In general, direct current (DC) power supplies are either unregulated or regulated. Regulated supplies usually come in several options including linear, switched and battery-based types. With the development of power supply technologies, a power supply integrated circuit (IC) is acknowledged as being widely used in various power supply environments accompanying with related converters design scheme. And therefore, it is believed that, how to provide a reliable and efficient power supply scheme for the power supply circuits has become a research hotspot in the recent years.

Moreover, regarding to optimizing the design schemes for power supply circuits, in addition to improving the overall power efficiency and to complying with a variety of different load current requirements, it is also required and critical to save the power loss when the converter in the power supply circuit is switched for outputting and supplying the power to either a heavy load or a light load. As a result, optimization and modifications for the current power supply circuits so far are still challenging and to be expected in the existing technologies.

And therefore, it, in view of all, should be apparent and obvious that there is indeed an urgent need for the professionals in the field for a novel and inventive methodology to be developed, so as to solve the above-mentioned issues, and to provide a new operation method for power supply circuits, in order to enhance the entire power efficiency of a conventional power supply circuit.

SUMMARY OF THE INVENTION

In order to overcome the above-mentioned disadvantages, one major objective in accordance with the present invention is to provide a novel operation method of a power supply circuit.

The proposed operation method is applicable to a power supply circuit of a single inductor bipolar output (SIBO) power supply system, such that both a positive output voltage (VOP) and a negative output voltage (VON) can be increased through the single inductor energizing mode including three operation phases (P1, P2, P3). The disclosed operation method of the power supply circuit can be, and yet not limited to being applied to a DC to DC boost converter, inverting converter, and/or bulk-boost converter. Variations can be made according to the actual circuit design requirements when necessary.

By employing the present invention, the positive output voltage (VOP) and the negative output voltage (VON) can be effectively enhanced to reach its expected voltage potential when an output VOP (for instance, +3.5V) and an output VON (for instance, −3.5V) are lowered than its predetermined voltage potential (for instance, +5V, −5V). As a result, it is believed that the present invention is advantageous of providing an extraordinary and optimized power efficiency of a conventional power supply circuit.

In specific, according to one embodiment of the invention, the disclosed operation method is applicable to a power supply circuit, in which the power supply circuit is provided with an input voltage (VIN) and operable to generate a positive output voltage (VOP) and a negative output voltage (VON). The power supply circuit is electrically connected with an inductor through a first inductor node (LXN) and a second inductor node (LXP). The disclosed operation method of the power supply circuit comprises a plurality of steps as introduced in the following sections.

First, the power supply circuit is determined to operate in a first period mode, wherein the first period mode includes a first phase, a second phase and a third phase. Then, the power supply circuit is controlled to operate in the first phase of the first period mode, and a voltage level of the first inductor node is at a high voltage level and a voltage level of the second inductor node is at a low voltage level in the first phase of the first period mode. Subsequently, the power supply circuit is then controlled to operate in the second phase of the first period mode successively after the first phase of the first period mode, and the voltage level of the first inductor node is at a high voltage level and the voltage level of the second inductor node is at a high voltage level in the second phase of the first period mode. And at least, the power supply circuit is controlled to operate in the third phase of the first period mode successively after the second phase of the first period mode, and the voltage level of the first inductor node is at a low voltage level and the voltage level of the second inductor node is at a high voltage level in the third phase of the first period mode, such that no transition of the voltage level of the second inductor node is generated when the power supply circuit switches from the second phase of the first period mode to the third phase of the first period mode.

In one embodiment of the invention, the provided power supply circuit may include a first switch electrically connected between the first inductor node and an input node being coupled with the input voltage, a second switch electrically connected between the first inductor node and a ground, a third switch electrically connected between the second inductor node and the ground, a fourth switch electrically connected between the second inductor node and a first output node for outputting the positive output voltage, and a fifth switch electrically connected between the first inductor node and a second output node for outputting the negative output voltage. By controlling the turning on and turning off states of the configured first switch, the second switch, the third switch, the fourth switch and the fifth switch sequentially, the present invention achieves in increasing both the positive output voltage and the negative output voltage through the inductor energizing mode including the three operation phases (i.e., the above-mentioned first phase, second phase, and third phase of the first period mode).

According to the embodiment of the present invention, the first switch and the third switch are turned on when the power supply circuit operates in the first phase of the first period mode. Then, when the power supply circuit enters and is operating in the second phase successively after the first phase, the first switch remains turned on while the third switch is switched off such that the fourth switch is turned on. In other words, the first switch and the fourth switch are turned on when the power supply circuit operates in the second phase of the first period mode. And subsequently, when the power supply circuit enters and is operating in the third phase successively after the second phase, the fourth switch remains turned on while the first switch is switched off such that the fifth switch is turned on. In other words, the fourth switch and the fifth switch are turned on when the power supply circuit operates in the third phase of the first period mode. By adopting the disclosed operation method of the present invention, it requires only to turn off one switch in exchange for turning on another switch. As a result, it is believed that redundant power loss due to the conventional switching cutover is significantly reduced, and the present invention is thus beneficial for the purpose of improving an overall power efficiency of a typical power supplying IC.

On the other hand, according to an alternative embodiment of the invention, the power supply circuit may also be controlled to operate in a second period mode, which includes a first phase and a second phase. And the voltage level of the first inductor node is at a high voltage level and the voltage level of the second inductor node is at a low voltage level in the first phase of the second period mode (the first switch and the third switch are turned on). And, the voltage level of the first inductor node is then turned to be at a low voltage level and the voltage level of the second inductor node is at a low voltage level when the power supply circuit operates in the second phase of the second period mode (the third switch and the fifth switch are turned on). In such an alternative embodiment, when the power supply circuit operates in the second period mode, energizing current is generated and provided to the second output node for increasing the negative output voltage.

And in addition, according to one another alternative embodiment of the invention, the power supply circuit may also be controlled to operate in a third period mode, which includes a first phase and a second phase. And the voltage level of the first inductor node is at a high voltage level and the voltage level of the second inductor node is at a low voltage level in the first phase of the third period mode (the first switch and the third switch are turned on). And, the voltage level of the first inductor node is then turned to be at a low voltage level and the voltage level of the second inductor node is turned to be at a high voltage level when the power supply circuit operates in the second phase of the third period mode (the second switch and the fourth switch are turned on). According to such another alternative embodiment, when the power supply circuit operates in the third period mode, energizing current is generated and provided to the first output node for increasing the positive output voltage.

As such, while compared to the prior arts, it is guaranteed that the present invention is apparently effective in reducing power loss and avoiding redundant power waste of the power supply circuit. Thereby, it is believed that the present invention achieves to successfully solve the problems of prior arts and performs as being highly competitive and able to be widely utilized in any related industries.

These and other objectives of the present invention will become obvious to those of ordinary skill in the art after reading the following detailed description of preferred embodiments.

It is to be understood that both the foregoing general description and the following detailed description are exemplary and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
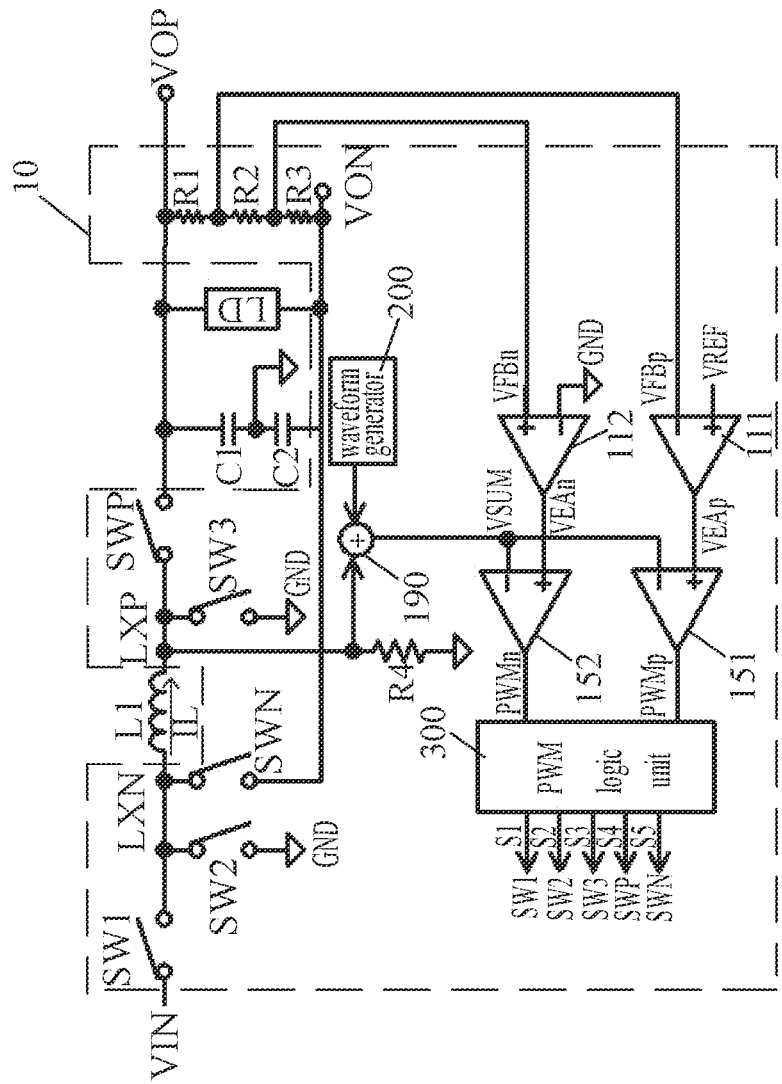
FIG. 1 shows a diagram schematically illustrating a power supply circuit in accordance with an embodiment of the invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express that the embodiment in the invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the article "a" and "the" includes the meaning of "one or at least one" of the element or component. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. Every example in the present specification cannot limit the claimed scope of the invention.

In the following descriptions, an operation method of a power supply circuit, for instance, a power supply integrated chip (IC), will be provided. The proposed operation method is applicable to any power supply integrated chips that can be applied to wearable electronic products, such as: an electronic bracelet, an electronic watch, and so on. According to one embodiment of the present invention, the disclosed power supply circuit is a Single Inductor Bipolar Output (SIBO) circuit, and by adopting the disclosed power supply circuit, the SIBO circuit can be adapted to provide various voltage conversion ratios, and to meet a variety of different load current requirements. Meanwhile, both stable and high power output efficiency can be achieved at the same time. The present invention is beneficial to enhancing the overall power efficiency of a power supplying circuit and avoid redundant switching power loss consumption.

Please refer to FIG. 1, which shows a diagram schematically illustrating a power supply circuit in accordance with an embodiment of the invention. The provided power supply circuit 10 of the present invention is electrically connected to an input node which is provided with an input voltage VIN. And the provided power supply circuit 10 of the present invention is operable to generate a positive output voltage VOP through a first output node and a negative output voltage VON through a second output node. According to the embodiment of the present invention, the first output node of the disclosed power supply circuit 10 is coupled and considered for outputting the positive output voltage VOP, and the second output node of the disclosed power supply circuit 10 is coupled and considered for outputting the negative output voltage VON. As can be seen in FIG. 1, the power supply circuit 10 is electrically connected with an inductor L1 through a first inductor node LXN and a second inductor node LXP. The power supply circuit 10 comprises a first switch SW1, a second switch SW2, a third switch SW3, a fourth switch SWP and a fifth switch SWN. By controlling the turning on and turning off states of the first switch SW1, the second switch SW2, the third switch SW3, the fourth switch SWP and the fifth switch SWN sequentially, the present invention achieves in increasing both the positive output voltage VOP and the negative output voltage VON through the inductor energizing mode including three operation phases.

To be more specific, according to the embodiment of the present invention, the first switch SW1 is electrically connected between the first inductor node LXN and the input node being coupled with the input voltage VIN. The second switch SW2 is electrically connected between the first inductor node LXN and a ground GND. The third switch SW3 is electrically connected between the second inductor node LXP and the ground GND. The fourth switch SWP is electrically connected between the second inductor node LXP and the first output node which is for outputting the positive output voltage VOP. And the fifth switch SWN is electrically connected between the first inductor node LXN and the second output node which is for outputting the negative output voltage VON.

The first capacitor C1 is electrically connected between the positive output voltage VOP and the ground GND. The second capacitor C2 is electrically connected between the negative output voltage VON and the ground GND. According to the embodiment of the invention, the first capacitor C1 and the second capacitor C2 are decoupling capacitors. The positive output voltage VOP, which is higher than 0V, is generated on the first capacitor C1 and drives the load LD. The negative output voltage VON, which is lower than 0V, is generated on the second capacitor C2 and drives the load LD. A first resistor R1, a second resistor R2 and a third resistor R3 are electrically connected in series between the positive output voltage VOP and the negative output voltage VON, so as to generate a first feedback voltage VFBp which is related to the positive output voltage VOP, and to generate a second feedback voltage VFBn which is related to the negative output voltage VON.

A first compensated error amplifier 111 is configured and coupled to receive a reference voltage VREF and the first feedback voltage VFBp which is related to the positive output voltage VOP. The first compensated error amplifier 111 then sends the first output signal VEAp to the first comparator 151. In other words, the first output signal VEAp (i.e. the first compensated error amplifier output signal) from the first compensated error amplifier 111 is in response to the positive output voltage VOP.

Similarly, the second compensated error amplifier 112 is configured and coupled to receive a ground voltage from the ground GND and the second feedback voltage VFBn which is related to the negative output voltage VON. The second compensated error amplifier 112 then sends the second output signal VEAn to the second comparator 152. In other words, the second output signal VEAn (i.e. the second compensated error amplifier output signal) from the second compensated error amplifier 112 is in response to the negative output voltage VON.

An adder 190 is configured to add the periodic waveform signal from the waveform generator 200 with the voltage (IL*Rs), wherein IL refers to the inductor current of the inductor L1, and Rs refers to the resistance of the fourth resistor R4. An output sum voltage VSUM (i.e. a sum signal) from the adder 190 is then output to the first comparator 151 and the second comparator 152.

The first comparator 151 is configured to receive the output sum voltage VSUM from the adder 190 and the first output signal VEAp from the first compensated error amplifier 111. The first comparator 151 then accordingly sends its output signal (i.e. the first comparison signal PWMp) to a PWM (Pulse Width Modulation) logic unit 300. According to the embodiment of the present invention, the first comparison signal PWMp goes to logical high when the potential of the output sum voltage VSUM is higher than or equal to the potential of the first output signal VEAp.

The second comparator 152 is configured to receive the output sum voltage VSUM from the adder 190 and the second output signal VEAn from the second compensated error amplifier 112. The second comparator 152 then accordingly sends its output signal (i.e. the second comparison signal PWMn) to the PWM (Pulse Width Modulation) logic unit 300. According to the embodiment of the present invention, the second comparison signal PWMn goes to logical high when the potential of the output sum voltage VSUM is higher than or equal to the potential of the second output signal VEAn.

As a result, the PWM logic unit 300 is configured and able to generate the first control signal S1, the second control signal S2, the third control signal S3, the fourth control signal S4 and the fifth control signal S5 according to the above mentioned first comparison signal PWMp from the first comparator 151 as well as the second comparison signal PWMn from the second comparator 152. Details of the PWM logic unit 300 are known and therefore will be omitted herein the present invention.

According to the embodiment of the present invention, the first control signal S1 will be transmitted to the first switch SW1, such that an on and off state of the first switch SW1 is determined and controlled by the first control signal S1.

In the same manners, the second control signal S2 is transmitted to the second switch SW2, such that an on and off state of the second switch SW2 is determined and controlled by the second control signal S2. The third control signal S3 is transmitted to the third switch SW3, such that an on and off state of the third switch SW3 is determined and controlled by the third control signal S3. The fourth control signal S4 is transmitted to the fourth switch SWP, such that an on and off state of the fourth switch SWP is determined and controlled by the fourth control signal S4. And the fifth control signal S5 is transmitted to the fifth switch SWN, such that an on and off state of the fifth switch SWN is determined and controlled by the fifth control signal S5.

In the following sections, in order to fully introduce the disclosed operation method of the power supply circuit 10 of the present invention, please refer to FIG. 2 which schematically shows three different operating modes provided by the proposed power supply circuit 10 of the present invention. As can be seen, the first period mode includes a first phase P1, a second phase P2 and a third phase P3. On the other hand, the second period mode includes a first phase P1 and a second phase P2. And, the third period mode includes a first phase P1 and a second phase P2.

Figure 2:
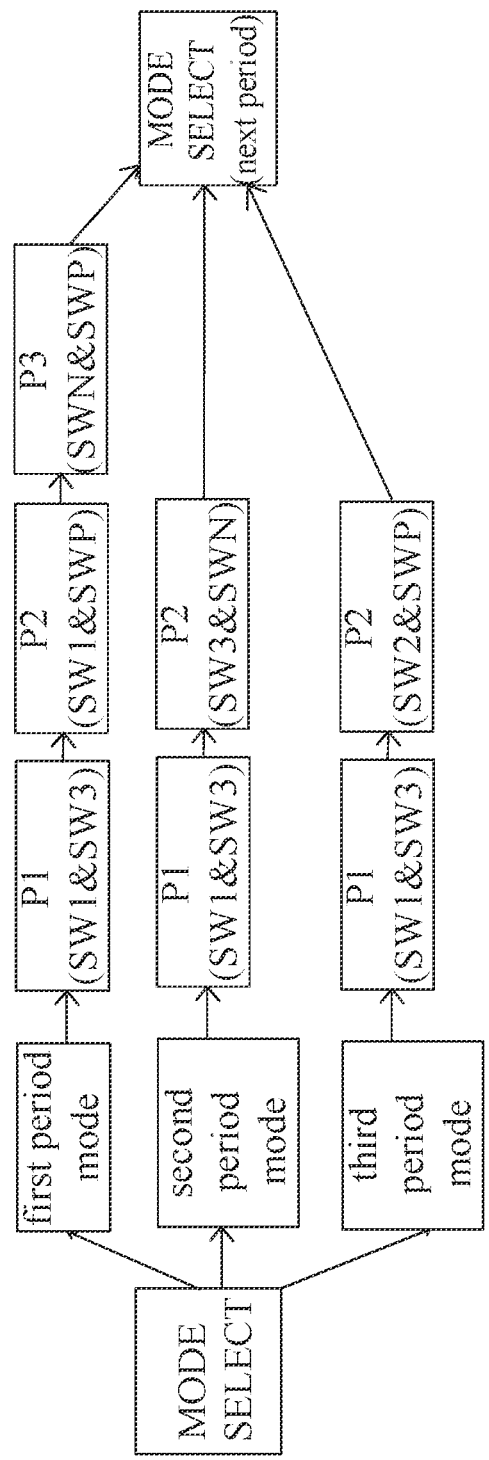
FIG. 2 schematically shows three different operating modes provided by the proposed power supply circuit of the present invention.
Figure 3:
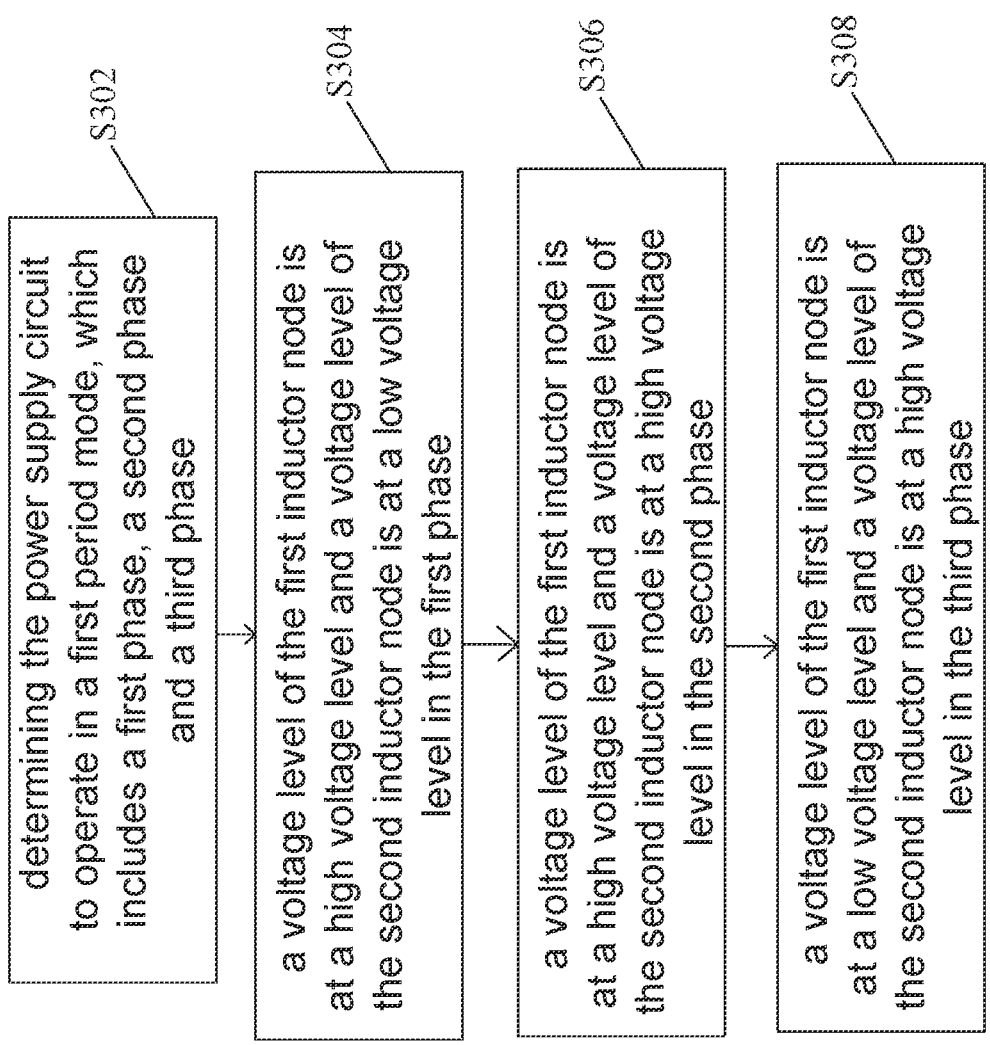
FIG. 3 shows a flow chart illustrating the performing steps of the operation method in accordance with the embodiment of the invention.

FIG. 3 shows a flow chart illustrating the performing steps of the disclosed operation method in accordance with the embodiment of the invention. As referring to the step S302, the power supply circuit is determined to operate in the first period mode, wherein the first period mode illustrated as in FIG. 2, includes the first phase P1, the second phase P2 and the third phase P3.

Figure 4:
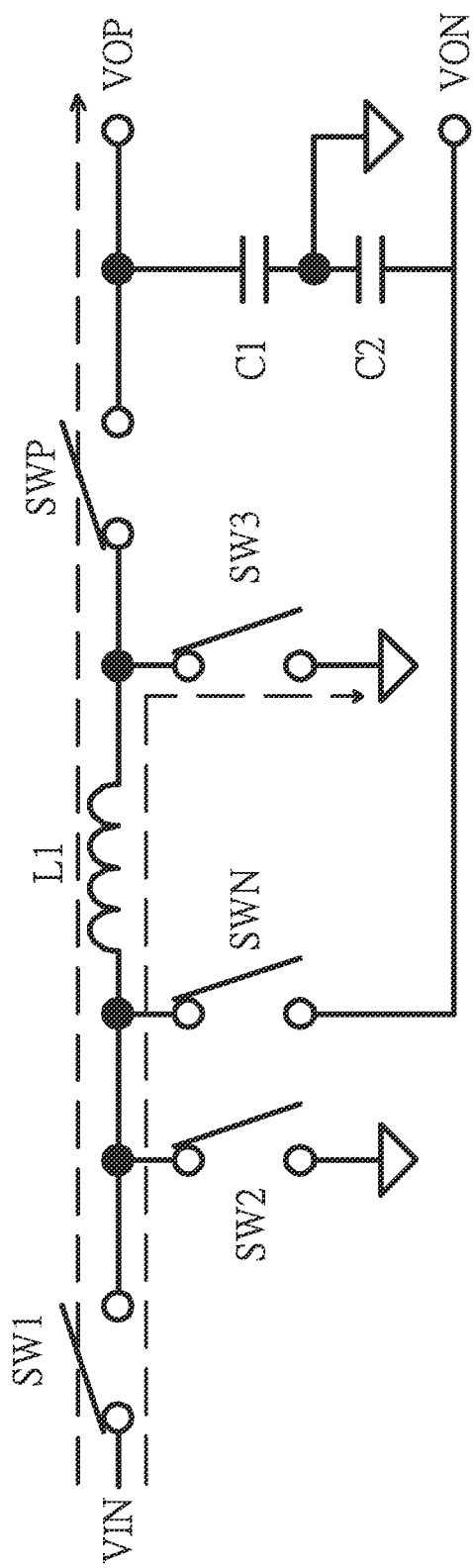
FIG. 4 shows the corresponding current flows as illustrated by arrows in the figure, in relative with the first phase and the second phase of the first period mode.

According to the present invention, the first switch SW1 and the third switch SW3 are turned on when the power supply circuit 10 operates in the first phase P1 of the first period mode. After that, when the power supply circuit 10 operates in the second phase P2 successively after the first phase P1 of the first period mode, the first switch SW1 remains turned on while the third switch SW3 is switched off such that the fourth switch SWP is turned on. In other words, the first switch SW1 and the fourth switch SWP are turned on when the power supply circuit 10 operates in the second phase P2 of the first period mode. FIG. 4 shows the corresponding current flows as illustrated by arrows in the figure, in relative with the first phase P1 and the second phase P2 of the first period mode.

Figure 5:
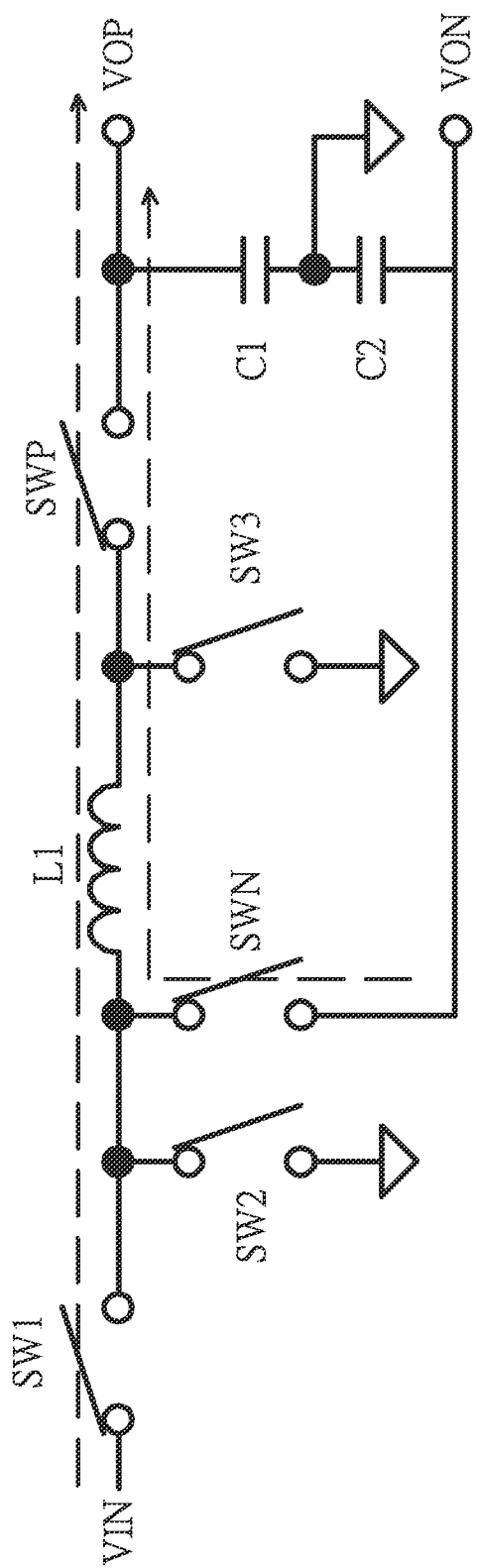
FIG. 5 shows the corresponding current flows as illustrated by arrows in the figure in relative with the second phase and the third phase of the first period mode.

After that, when the power supply circuit 10 operates in the third phase P3 successively after the second phase P2 of the first period mode, the fourth switch SWP remains turned on while the first switch SW1 is switched off such that the fifth switch SWN is turned on. In other words, the fourth switch SWP and the fifth switch SWN are turned on when the power supply circuit 10 operates in the third phase P3 of the first period mode. FIG. 5 shows the corresponding current flows in relative with the second phase P2 and the third phase P3 of the first period mode as illustrated by arrows in the figure.

Figure 6:
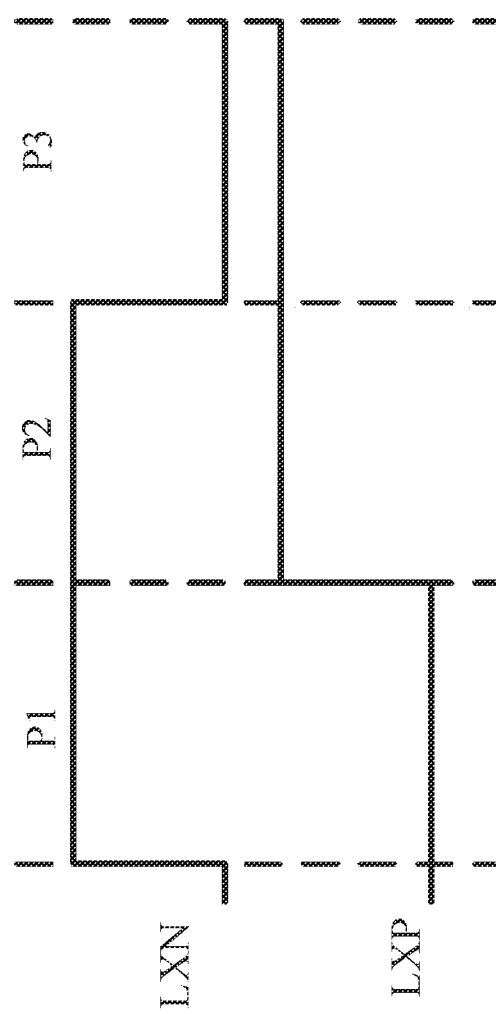
FIG. 6 schematically shows the voltage levels of the first inductor node and the second inductor node in accordance with the embodiment of the present invention when the power supply circuit is applied to operate in the first period mode.

Please find accompanying waveforms in FIG. 6, which schematically shows the voltage levels of the first inductor node LXN and the second inductor node LXP in accordance with the embodiment of the present invention when the power supply circuit is applied to operate in the first period mode including the first phase P1, the second phase P2 and the third phase P3.

As can be seen, when the disclosed power supply circuit is operating in the first phase P1 of the first period mode (i.e.

the first switch SW1 and the third switch SW3 are turned on), a voltage level of the first inductor node LXN is at a high voltage level and a voltage level of the second inductor node LXP is at a low voltage level in the first phase P1 of the first period mode, as referring to the step S304 in FIG. 3.

Later, when the disclosed power supply circuit enters and is operating in the second phase P2 of the first period mode successively after the first phase P1 of the first period mode (i.e. the first switch SW1 and the fourth switch SWP are turned on), the voltage level of the first inductor node LXN is at a high voltage level and the voltage level of the second inductor node LXP is at a high voltage level in the second phase P2 of the first period mode, as referring to the step S306 in FIG. 3.

And at last, when the disclosed power supply circuit enters and is operating in the third phase P3 of the first period mode successively after the second phase P2 of the first period mode (i.e. the fourth switch SWP and the fifth switch SWN are turned on), then the voltage level of the first inductor node LXN is at a low voltage level and the voltage level of the second inductor node LXP is at a high voltage level in the third phase P3 of the first period mode, as referring to the step S308 in FIG. 3. It draws our attention that no transition of the voltage level of the second inductor node LXP is generated when the disclosed power supply circuit switches from the second phase P2 of the first period mode to the third phase P3 of the first period mode. As a result, it is apparent that by employing the present invention, it significantly reduces the switching loss and dead time consumption since only one switch is switched off for turning on the other during the phase transition either it is from the first phase P1 to the second phase P2, or from the second phase P2 to the third phase P3.

As such, it is believed that by adopting the proposed operation method of the present invention, when the power supply circuit operates in the first period mode, energizing currents can be effectively generated and provided both to the first output node for increasing the positive output voltage VOP and to the second output node for increasing the negative output voltage VON. The disclosed operation method of the power supply circuit can be widely applied to and applicable for a DC to DC boost converter, inverting converter, and/or bulk-boost converter. For instance, when either the converter is designed in the SIBO scheme and have the dual outputs, including the positive output voltage VOP and the negative output voltage VON, and the positive output voltage VOP and the negative output voltage VON is designed to have an expected voltage value, for example, +5V and −5V, the proposed operation method of the present invention can be effectively applied for increasing the positive output voltage VOP and the negative output voltage VON when a VOP (for instance, +3.5V) is lowered than its predetermined voltage potential (i.e. +5V), and a VON (for instance, −3.5V) is lowered than its predetermined voltage potential (i.e. −5V), since energizing currents can be effectively generated and provided through the inductor energizing mode (which is referred as the first period mode of the present invention) including the three operation phases P1, P2 P3. And therefore, it is believed that the present invention is advantageous of providing an optimal power efficiency of a power supply circuit.

In addition, please refer to FIG. 2 for an alternative operation mode of the present invention. The disclosed power supply circuit may be optionally designed and determined to operate in a second period mode, wherein the second period mode includes a first phase P1 and a second phase P2.

Figure 7:
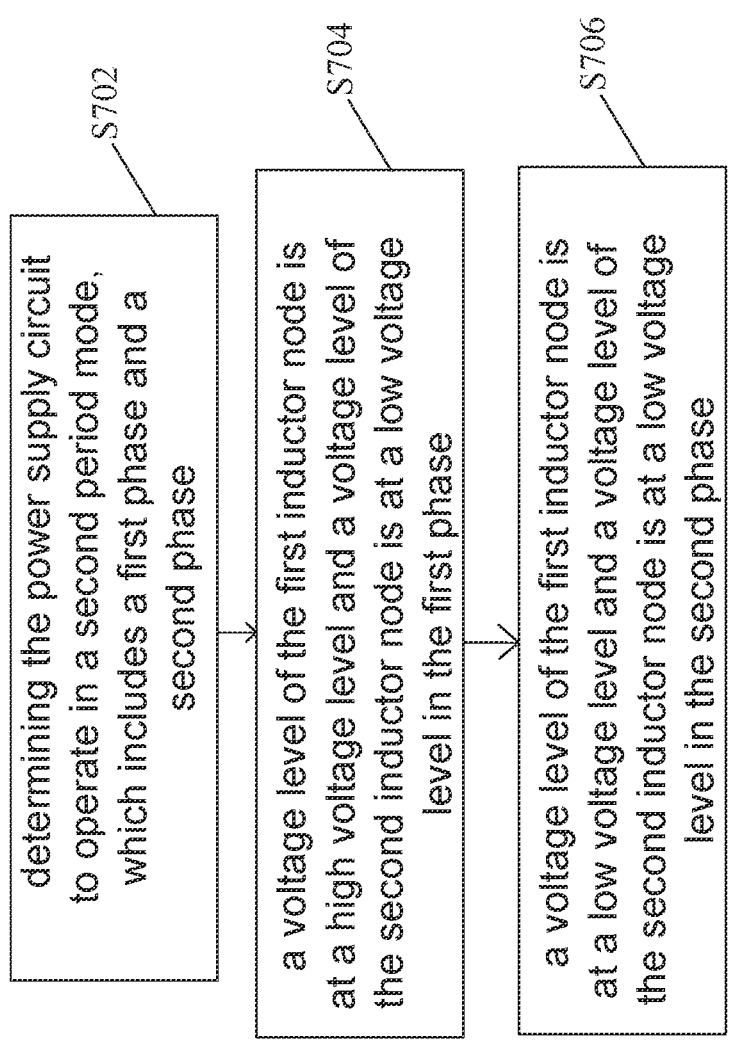
FIG. 7 shows a flow chart illustrating the performing steps of the operation method in accordance with the embodiment of the invention when the power supply circuit is operating in a second period mode.

FIG. 7 shows a flow chart illustrating the performing steps of the operation method in accordance with the embodiment of the invention when the power supply circuit is operating in a second period mode. As referring to the step S702, the power supply circuit can be determined to operate in the second period mode, and the second period mode illustrated as in FIG. 2, includes the first phase P1 and the second phase P2.

Figure 8:
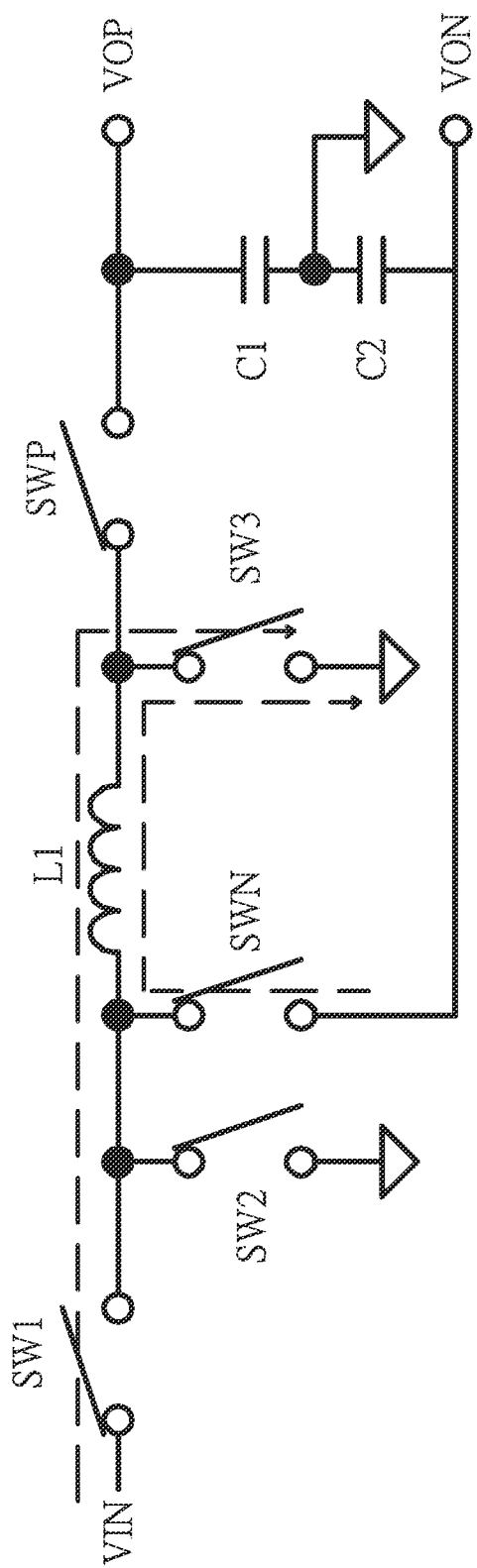
FIG. 8 shows the corresponding current flows as illustrated by arrows in the figure, in relative with the first phase and the second phase of the second period mode.

According to the alternative embodiment of the present invention, the first switch SW1 and the third switch SW3 are turned on when the power supply circuit 10 operates in the first phase P1 of the second period mode. After that, when the power supply circuit 10 enters and is operating in the second phase P2 successively after the first phase P1 of the second period mode, the third switch SW3 remains turned on while the first switch SW1 is switched off such that the fifth switch SWN is turned on. In other words, the third switch SW3 and the fifth switch SWN are turned on when the power supply circuit 10 operates in the second phase P2 of the second period mode. FIG. 8 shows the corresponding current flows as illustrated by arrows in the figure, in relative with the first phase P1 and the second phase P2 of the second period mode.

Figure 9:
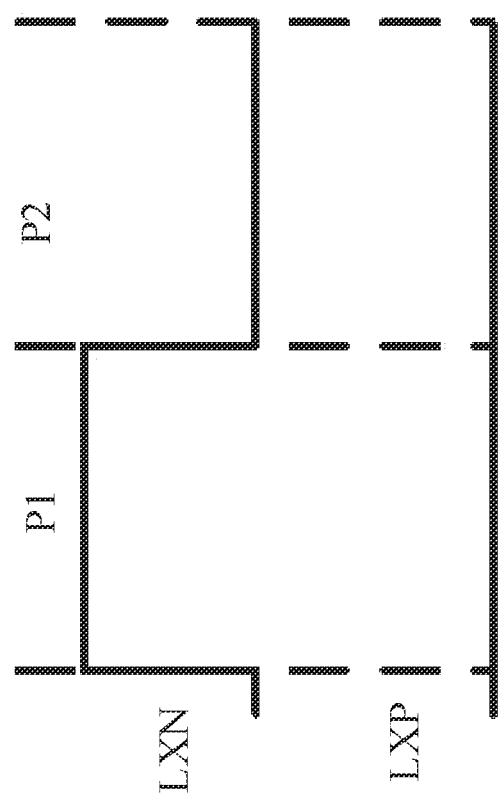
FIG. 9 schematically shows the voltage levels of the first inductor node and the second inductor node in accordance with the embodiment of the present invention when the power supply circuit is applied to operate in the second period mode.

Please find accompanying waveforms in FIG. 9, which schematically shows the voltage levels of the first inductor node LXN and the second inductor node LXP in accordance with the alternative embodiment of the present invention when the power supply circuit is applied to operate in the second period mode including the first phase P1 and the second phase P2.

As can be seen, when the disclosed power supply circuit is operating in the first phase P1 of the second period mode (i.e. the first switch SW1 and the third switch SW3 are turned on), a voltage level of the first inductor node LXN is at a high voltage level and a voltage level of the second inductor node LXP is at a low voltage level in the first phase P1 of the second period mode, as referring to the step S704 in FIG. 7.

And afterwards, when the disclosed power supply circuit enters and is operating in the second phase P2 of the second period mode successively after the first phase P1 of the second period mode (i.e. the third switch SW3 and the fifth switch SWN are turned on), then the voltage level of the first inductor node LXN is at a low voltage level and the voltage level of the second inductor node LXP is at a low voltage level in the second phase P2 of the second period mode, as referring to the step S706 in FIG. 7.

According to the alternative embodiment of the present invention, when the proposed operation method of the present invention is employed and the power supply circuit is determined to operate in the second period mode (also known as a voltage inverting mode), then the energizing current is generated and provided to the second output node for increasing the negative output voltage VON. For example, when a VOP is sufficient (i.e., can be kept at +5V), and nevertheless a VON (for instance, −3.5V) is lowered than its predetermined voltage potential (i.e. −5V), then it is feasible to adopt the proposed operation method of the present invention for controlling the power supply circuit to operate in the second period mode (i.e. voltage inverting mode), so as to only enhance the negative output voltage VON.

And in another aspect, please refer to FIG. 2 moreover, for one another alternative operation mode of the present invention. The disclosed power supply circuit may also be optionally designed and determined to operate in a third period mode, wherein the third period mode includes a first phase P1 and a second phase P2.

Figure 10:
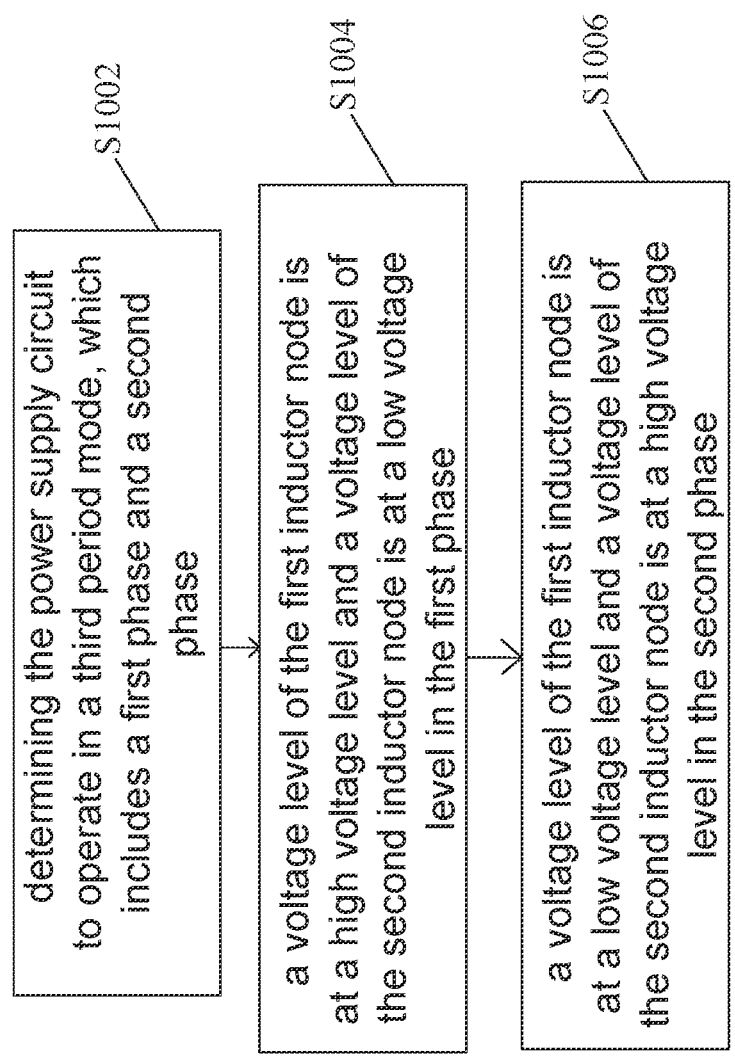
FIG. 10 shows a flow chart illustrating the performing steps of the operation method in accordance with the embodiment of the invention when the power supply circuit is operating in a third period mode.

FIG. 10 shows a flow chart illustrating the performing steps of the operation method in accordance with the one another embodiment of the invention when the power supply circuit is operating in a third period mode. As referring to the step S1002, the power supply circuit can be determined to operate in the third period mode, and the third period mode illustrated as in FIG. 2, may include the first phase P1 and the second phase P2.

Figure 11:
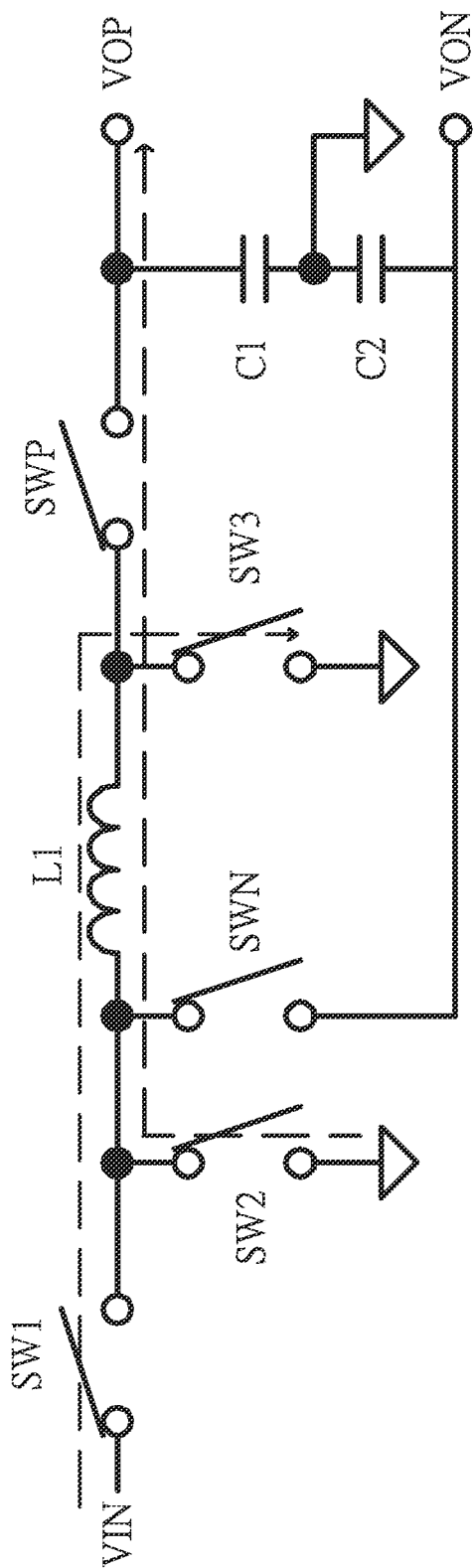
FIG. 11 shows the corresponding current flows as illustrated by arrows in the figure, in relative with the first phase and the second phase of the third period mode.

According to the one another embodiment of the present invention, the first switch SW1 and the third switch SW3 are turned on when the power supply circuit 10 operates in the first phase P1 of the third period mode. After that, when the power supply circuit 10 enters and is operating in the second phase P2 successively after the first phase P1 of the third period mode, the first switch SW1 and the third switch SW3 are switched off such that the second switch SW2 and the fourth switch SWP are turned on. In other words, the second switch SW2 and the fourth switch SWP are turned on when the power supply circuit 10 operates in the second phase P2 of the third period mode. FIG. 11 shows the corresponding current flows as illustrated by arrows in the figure, in relative with the first phase P1 and the second phase P2 of the third period mode.

Figure 12:
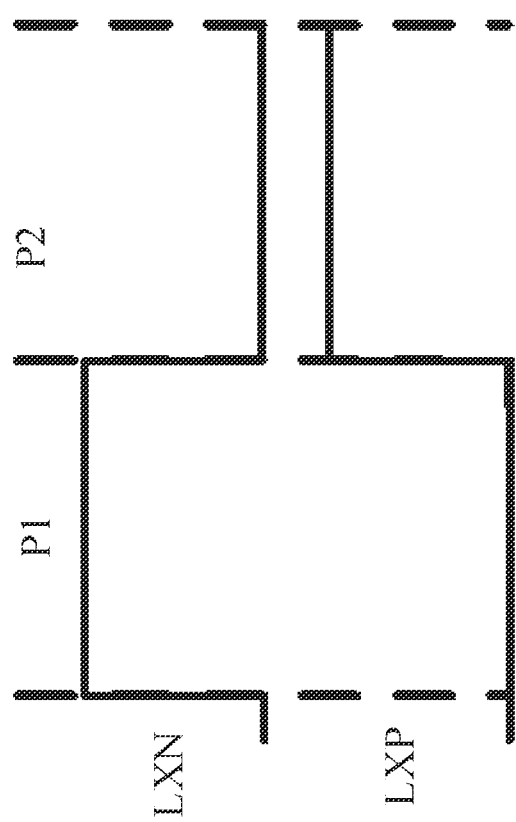
FIG. 12 schematically shows the voltage levels of the first inductor node and the second inductor node in accordance with the embodiment of the present invention when the power supply circuit is applied to operate in the third period mode.

Please also find accompanying waveforms in FIG. 12, which schematically shows the voltage levels of the first inductor node LXN and the second inductor node LXP in accordance with the one another embodiment of the present invention when the power supply circuit is applied to operate in the third period mode including the first phase P1 and the second phase P2.

As can be seen, when the disclosed power supply circuit is operating in the first phase P1 of the third period mode (i.e. the first switch SW1 and the third switch SW3 are turned on), a voltage level of the first inductor node LXN is at a high voltage level and a voltage level of the second inductor node LXP is at a low voltage level in the first phase P1 of the third period mode, as referring to the step S1004 in FIG. 10.

And afterwards, when the disclosed power supply circuit enters and is operating in the second phase P2 of the third period mode successively after the first phase P1 of the third period mode (i.e. the second switch SW2 and the fourth switch SWP are turned on), then the voltage level of the first inductor node LXN is at a low voltage level and the voltage level of the second inductor node LXP is at a high voltage level in the second phase P2 of the third period mode, as referring to the step S1006 in FIG. 10.

As a result, it is evident that according to one another alternative embodiment of the present invention, when the proposed operation method of the present invention is employed and the power supply circuit is determined to operate in the third period mode (also known as a voltage bulk-boost mode), then the energizing current is generated and provided to the first output node for increasing the positive output voltage VOP. For example, when a VON is sufficient (i.e., can be kept at −5V), and nevertheless a VOP (for instance, +3.5V) is lowered than its predetermined voltage potential (i.e. +5V), then it is also applicable to adopt the proposed operation method of the present invention for controlling the power supply circuit to operate in the third period mode (i.e. voltage bulk-boost mode), so as to only enhance the positive output voltage VOP.

Apparently, the present invention is thus achieving to greatly improve the entire power supplying efficiency of a power supply circuit and therefore, is beneficial to avoiding redundant power loss on account of less switching loss being made.

As a result, it is believed that, according to the several variant embodiments of the present invention, the above disclosed operation method is proposed to be applied to a power supplying IC, for instance, employing the SIBO design scheme.

In addition, based on at least one embodiment provided above, it is obvious that the proposed operation method of the power supply circuit disclosed in the present invention is characterized by generating and providing both an increased positive output voltage and an increased negative output voltage through the inductor energizing mode including three operation phases P1, P2 and P3. Moreover, it is important that, there is no transition of the voltage level of the second inductor node (LXP) to be generated when the power supply circuit switches during the phase transition period (especially switching from the second phase P2 to the third phase P3). Based on such important technical features, redundant power loss due to the conventional switching cutover is successfully suppressed. As a result, by employing the proposed operation method, the present invention is thus believed as beneficial to improving the output power efficiency of a typical power supplying IC.

On account of the above, it is obvious that the present invention, when compared to the existing technologies, apparently shows much more effective performances than before. In addition, it is believed that the present invention is instinct, effective and highly competitive for IC technology and industries in the market nowadays, whereby having extraordinary availability and competitiveness for future industrial developments and being in condition for early allowance.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. An operation method of a power supply circuit, wherein the power supply circuit is provided with an input voltage and operable to generate a positive output voltage and a negative output voltage, the power supply circuit is electrically connected with an inductor through a first inductor node and a second inductor node, the operation method of the power supply circuit comprising: determining the power supply circuit to operate in a first period mode, wherein the first period mode includes a first phase, a second phase and a third phase; controlling the power supply circuit to operate in the first phase of the first period mode, and a voltage level of the first inductor node is at a high voltage level and a voltage level of the second inductor node is at a low voltage level in the first phase of the first period mode; controlling the power supply circuit to operate in the second phase of the first period mode successively after the first phase of the first period mode, and the voltage level of the first inductor node is at a high voltage level and the voltage level of the second inductor node is at a high voltage level in the second phase of the first period mode; and controlling the power supply circuit to operate in the third phase of the first period mode successively after the second phase of the first period mode, and the voltage level of the first inductor node is at a low voltage level and the voltage level of the second inductor node is at a high voltage level in the third phase of the first period mode, such that no transition of the voltage level of the second inductor node is generated when the power supply circuit switches from the second phase of the first period mode to the third phase of the first period mode; and wherein the power supply circuit includes a first switch electrically connected between the first inductor node and an input node being coupled with the input voltage, a second switch electrically connected between the first inductor node and a ground, a third switch electrically connected between the second inductor node and the ground, a fourth switch electrically connected between the second inductor node and a first output node for outputting the positive output voltage, and a fifth switch electrically connected between the first inductor node and a second output node for outputting the negative output voltage.

2. The operation method of the power supply circuit according to claim 1, wherein when the power supply circuit operates in the first period mode, energizing currents are generated and provided both to a first output node for increasing the positive output voltage and to a second output node for increasing the negative output voltage.

3. The operation method of the power supply circuit according to claim 1, wherein the first switch and the third switch are turned on when the power supply circuit operates in the first phase of the first period mode.

4. The operation method of the power supply circuit according to claim 1, wherein the first switch and the fourth switch are turned on when the power supply circuit operates in the second phase of the first period mode.

5. The operation method of the power supply circuit according to claim 1, wherein the fourth switch and the fifth switch are turned on when the power supply circuit operates in the third phase of the first period mode.

6. The operation method of the power supply circuit according to claim 1, further comprising:
determining the power supply circuit to operate in a second period mode, wherein the second period mode includes a first phase and a second phase.

7. The operation method of the power supply circuit according to claim 6, further comprising:
controlling the power supply circuit to operate in the first phase of the second period mode, and the voltage level of the first inductor node is at a high voltage level and the voltage level of the second inductor node is at a low voltage level in the first phase of the second period mode; and
controlling the power supply circuit to operate in the second phase of the second period mode successively after the first phase of the second period mode, and the voltage level of the first inductor node is at a low voltage level and the voltage level of the second inductor node is at a low voltage level in the second phase of the second period mode.

8. The operation method of the power supply circuit according to claim 7, wherein the first switch and the third switch are turned on when the power supply circuit operates in the first phase of the second period mode.

9. The operation method of the power supply circuit according to claim 7, wherein the third switch and the fifth switch are turned on when the power supply circuit operates in the second phase of the second period mode.

10. The operation method of the power supply circuit according to claim 6, wherein when the power supply circuit operates in the second period mode, energizing current is generated and provided to the second output node for increasing the negative output voltage.

11. The operation method of the power supply circuit according to claim 1, further comprising:
determining the power supply circuit to operate in a third period mode, wherein the third period mode includes a first phase and a second phase.

12. The operation method of the power supply circuit according to claim 11, further comprising:
controlling the power supply circuit to operate in the first phase of the third period mode, and the voltage level of the first inductor node is at a high voltage level and the voltage level of the second inductor node is at a low voltage level in the first phase of the third period mode; and
controlling the power supply circuit to operate in the second phase of the third period mode successively after the first phase of the third period mode, and the voltage level of the first inductor node is at a low voltage level and the voltage level of the second inductor node is at a high voltage level in the second phase of the third period mode.

13. The operation method of the power supply circuit according to claim 12, wherein the first switch and the third switch are turned on when the power supply circuit operates in the first phase of the third period mode.

14. The operation method of the power supply circuit according to claim 12, wherein the second switch and the fourth switch are turned on when the power supply circuit operates in the second phase of the third period mode.

15. The operation method of the power supply circuit according to claim 11, wherein when the power supply circuit operates in the third period mode, energizing current is generated and provided to the first output node for increasing the positive output voltage.

* * * * *